(No Model.)

I. T. EVANS.
HARROW.

No. 531,308. Patented Dec. 25, 1894.

Witnesses: M. P. Smith, J. R. Orwig

Inventor: Ira T. Evans,
By Thomas G. Orwig, Attorney

UNITED STATES PATENT OFFICE.

IRA T. EVANS, OF CLIVE, IOWA.

HARROW.

SPECIFICATION forming part of Letters Patent No. 531,308, dated December 25, 1894.

Application filed March 27, 1894. Serial No. 505,351. (No model.)

*To all whom it may concern:*

Be it known that I, IRA T. EVANS, a citizen of the United States of America, residing at Clive, in the county of Polk and State of Iowa, have invented an Improvement in Drag-Harrows, of which the following is a specification.

My invention relates to the United States Patent No. 210,311, issued November 26, 1878.

My object is, primarily, to provide convenient and durable means whereby the drag chain may be adjusted in length, as required to regulate the height of the drag bar, to draft animals of different sizes, and to varying conditions of the soil, &c., and also to prevent upsetting when being operated on uneven ground.

My invention consists in the construction of the drag bar and connecting parts as hereinafter set forth, pointed out in my claims and illustrated in the accompanying drawings, in which—

Figure 1:
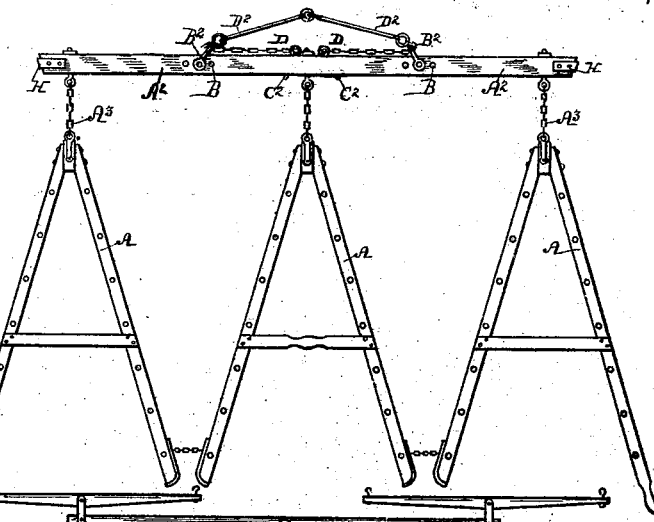
Figure 2:
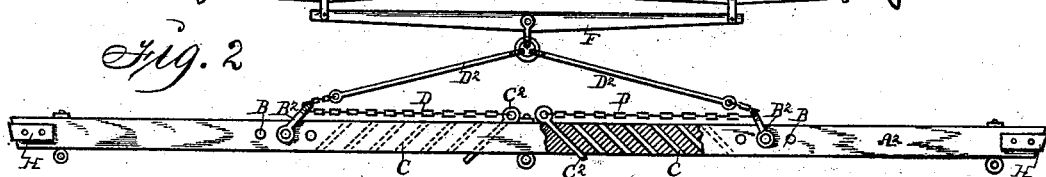
Figure 3:
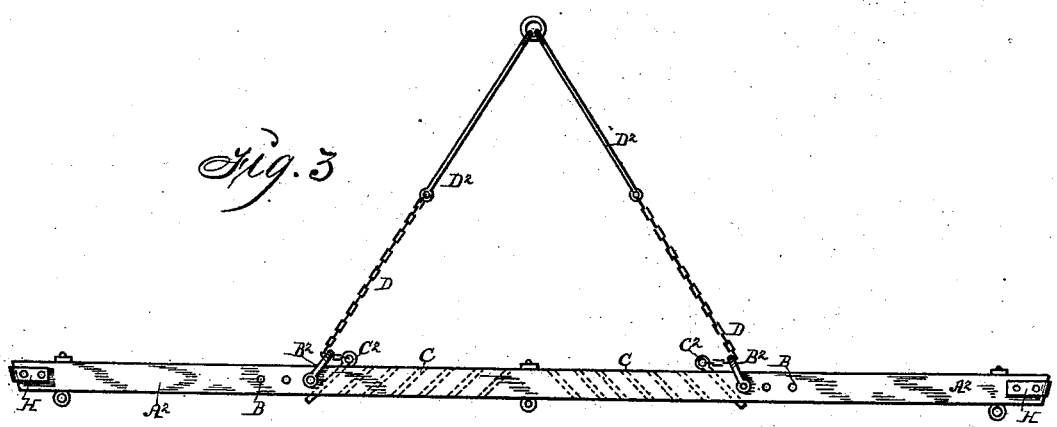
Figure 4:
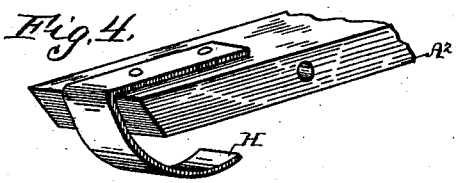

Figure 1 is a top or plan view of the complete harrow. Fig. 2 is a plan view of the drag bar with parts broken away to show its construction and a whiffletree connected therewith, at its minimum distance therefrom. Fig. 3 is a plan view of the drag bar showing the drag chain extended to its maximum distance, and Fig. 4 is an enlarged, perspective, detail view of one of the ends of the drag bar, showing the device for preventing its upsetting.

Referring to the accompanying drawings, the reference letter A is used to designate the harrow sections. $A^2$ is the drag bar to which the said harrow sections are secured by means of chains $A^3$. The vertical perforations B in the said drag bar on opposite sides of the center, provide means whereby the devices $B^2$ may be pivotally connected therewith, and adjusted relative to its center as required to govern the vibration of the harrow.

C represents a plurality of bores extended horizontally through the drag bar and diagonally across it, in opposite directions and outwardly from its forward central portion.

$C^2$ are eye-bolts adapted to enter the bores C. D represent drag chains attached to the said eye-bolts $C^2$ extended outwardly through the clevises $B^2$ and thence forwardly.

$D^2$ are connecting rods secured to the forward ends of the drag chains, to attach them to a whiffle-tree which latter is designated by the reference letter F.

It will readily be seen that the drag bar will be elevated from the ground surface in proportion as the whiffle-tree is in proximity to the drag bar and that the hereinbefore described means will admit of a comparatively large range of adjustment between the drag-bar and whiffle-tree.

It has been found heretofore that in turning in a field the ends of the drag bar will have a tendency to engage slight obstructions and tilt endwise. To overcome this difficulty I have provided the following device:

H represents a flat metal clip secured to the tops of the ends of the drag bar, and curved downwardly and inwardly therefrom, under the end of the drag bar so that the said end will slide over obstacles on the ground surface when being moved endwise of the drag-bar.

In the practical operation of my invention when the clevises $B^2$ are moved toward the ends of the drag bar C the vibration of the harrows is increased and vice versa, and, by adjusting the eyebolts $C^2$ in the drag bar the distance between the whiffletree and drag bar can be regulated as desired and maintained at any given distance at the same time that the clevises $B^2$ are moved inward or outward relative to the center of the drag bar. It is therefore obvious that my improvement is adapted for regulating the distance between the drag bar as required for different kinds of work and different kinds of soil and also adapted for regulating the vibrations of the harrows as they are dragged over the ground.

Heretofore when the connection with the drag bar was near the center thereof and the distance between the whiffle-tree and the drag bar increased, the drag bar would vibrate vertically and teeter and cause the traces to lash the horses. By my improved means of regulating the distance between the whiffle tree and the drag bar without making the connections near the center of the drag bar the teetering motion of the drag bar is prevented.

Having thus described the construction and operation of my invention, what I claim as new, and desire to secure by Letters Patent, is—

1. In a harrow, a drag bar having a series of vertical bores on each side of its center for adjustably connecting clevises therewith and also having a series of bores on each side of its center extending horizontally rearward, clevises connected with the bar at equal distances from the center of the bar, chains connected with a double tree and a bolt attached to the free end of each chain and passed through the said clevises and inserted in bores as shown and described, and all the parts arranged and combined for the purposes stated.

2. In a harrow, the combination of a drag-bar, a plurality of vertical bores on each side of the center, two clevises one on each side of the center of the drag-bar bores extending in opposite directions diagonally outward from the forward center thereof, two eye-bolts adapted to enter the said horizontal bores, drag chains secured to the said eye-bolts, extended through the said clevises, and a whiffletree connected with the forward ends of the said drag-chains substantially as set forth, 3. In a harrow the combination of a drag-bar, a plurality of vertical bores on each side of its center, two clevises one on each side of the center of the drag-bar, pins adapted to enter the said bores, a plurality of horizontal bores extending in opposite directions diagonally outward from the forward center thereof, two eye-bolts adapted to enter the said horizontal bores, drag chains secured to the said eye-bolts extended through the said clevises, connecting rods secured to the ends of the said drag chains, a whiffle-tree attached to the forward end of the said connecting rods, a curved metal strip secured to each end of the drag bar and curved downwardly and inwardly under the same, substantially as and for the purposes stated.

4. An improved drag harrow comprising the harrow sections A the drag-bar $A^2$ the chains $A^3$ connecting the harrow-sections and drag bar. The vertical perforations B in the drag-bar, the clevises $B^2$ the bores C the eye-bolts $C^2$, the drag-chains D, the connecting rods $D^2$ the whiffle-tree F and the metal clips H substantially as set forth.

IRA T. EVANS.

Witnesses:
J. R. ORWIG,
THOMAS G. ORWIG.